(12) United States Patent
Addis

(10) Patent No.: US 8,998,291 B1
(45) Date of Patent: Apr. 7, 2015

(54) VEHICLE ATTACHABLE CARRIER DEVICE

(71) Applicant: Joseph P. Addis, Vernal, UT (US)

(72) Inventor: Joseph P. Addis, Vernal, UT (US)

( * ) Notice: Subject to any disclaimer, the term of this patent is extended or adjusted under 35 U.S.C. 154(b) by 0 days.

(21) Appl. No.: 14/144,865

(22) Filed: Dec. 31, 2013

(51) Int. Cl.
*B60R 19/38* (2006.01)

(52) U.S. Cl.
CPC .................................... *B60R 19/38* (2013.01)

(58) Field of Classification Search
USPC ............ 296/180.1, 193.1; 293/115, 118, 145, 293/142, 143, 144; 280/770
See application file for complete search history.

(56) References Cited

U.S. PATENT DOCUMENTS

| | | | |
|---|---|---|---|
| 3,282,368 A * | 11/1966 | Pittera | 180/53.7 |
| 3,554,415 A | 1/1971 | Woods | |
| 3,862,777 A * | 1/1975 | Schifano | 296/91 |
| 4,099,760 A * | 7/1978 | Mascotte et al. | 293/115 |
| 4,410,207 A | 10/1983 | Scharf | |
| 4,610,458 A | 9/1986 | Garnham | |
| D297,724 S | 9/1988 | Helber | |
| 4,901,895 A | 2/1990 | Gancarz | |
| 5,067,760 A * | 11/1991 | Moore et al. | 293/115 |
| 5,823,585 A | 10/1998 | Tanguay | |
| 6,827,377 B2 | 12/2004 | Ferrigan | |
| 7,344,183 B2 * | 3/2008 | Brash | 296/180.3 |
| 8,038,186 B2 | 10/2011 | Roth | |
| 2006/0091171 A1 | 5/2006 | Wardell et al. | |
| 2009/0212581 A1 * | 8/2009 | Drever | 293/115 |
| 2010/0045012 A1 | 2/2010 | Lungershausen et al. | |
| 2011/0006553 A1 * | 1/2011 | Fretz et al. | 293/115 |
| 2013/0187395 A1 * | 7/2013 | Hanson et al. | 293/115 |

* cited by examiner

*Primary Examiner* — Jason S Morrow
(74) *Attorney, Agent, or Firm* — Kyle A. Fletcher, Esq.

(57) ABSTRACT

The vehicle attachable carrier device includes a mounting bracket assembly for movably mounting a guard frame to a vehicle that includes a bracket coupled to the vehicle. A frame is movably coupled to the bracket. The frame may guard the vehicle. The frame is positionable between a stored position and an extended position.

17 Claims, 3 Drawing Sheets

VEHICLE ATTACHABLE CARRIER DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicle accessories, more specifically, a brush guard that is able to rotate with respect to the vehicle.

SUMMARY OF THE INVENTION

An embodiment of the disclosure meets the needs presented above by generally comprising a bracket coupled to the vehicle. A frame is movably coupled to the bracket. The frame may guard the vehicle. The frame is positionable between a stored position and an extended position.

These together with additional objects, features and advantages of the vehicle attachable carrier device will be readily apparent to those of ordinary skill in the art upon reading the following detailed description of presently preferred, but nonetheless illustrative, embodiments of the the accompanying drawings.

In this respect, before explaining the current embodiments of the vehicle attachable carrier device in detail, it is to be understood that the vehicle attachable carrier device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle attachable carrier device.

It is therefore important that the claims be regarded as including such equivalent construction insofar as they do not depart from the spirit and scope of the vehicle attachable carrier device. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
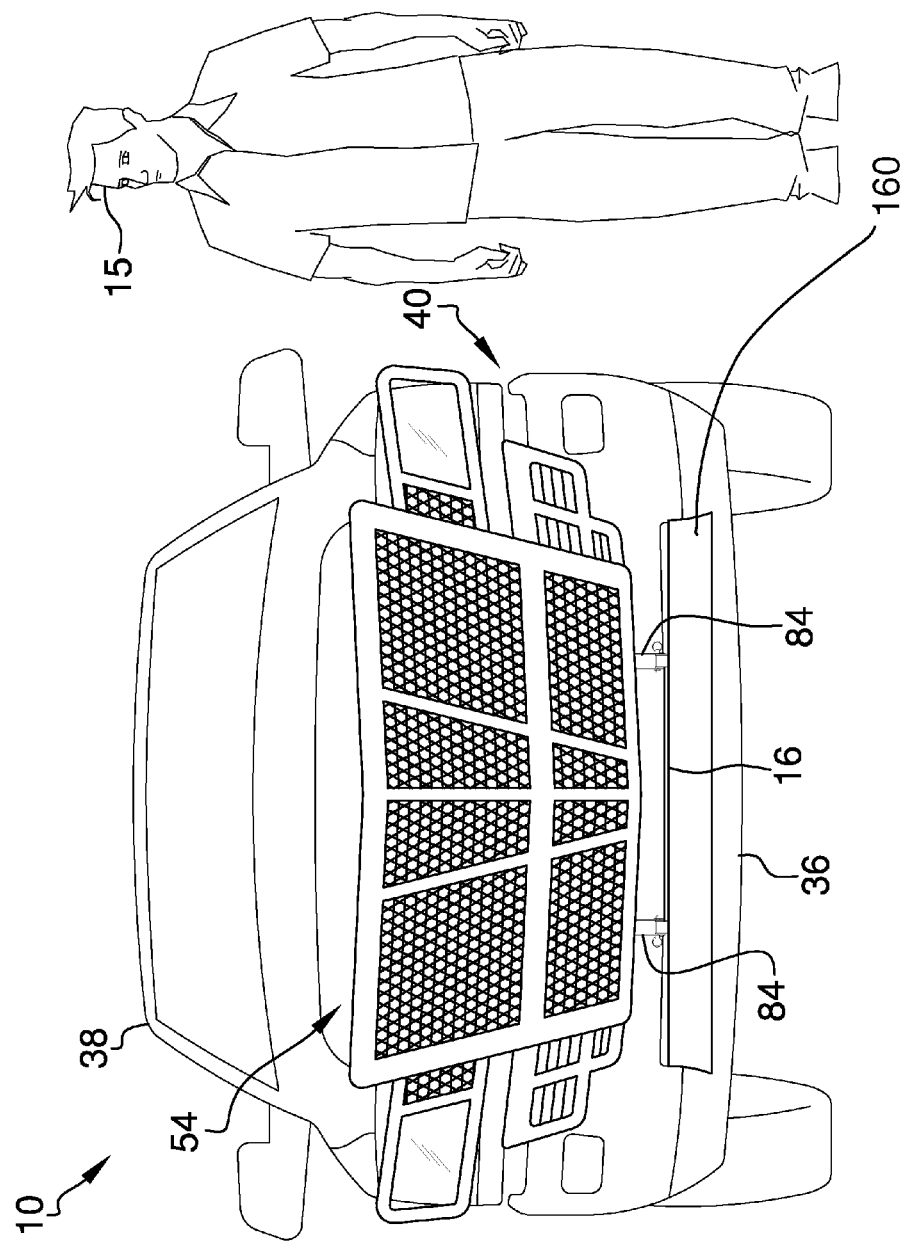
FIG. 1 is an in-use view of a mounting bracket assembly according to an embodiment of the disclosure.
Figure 2:
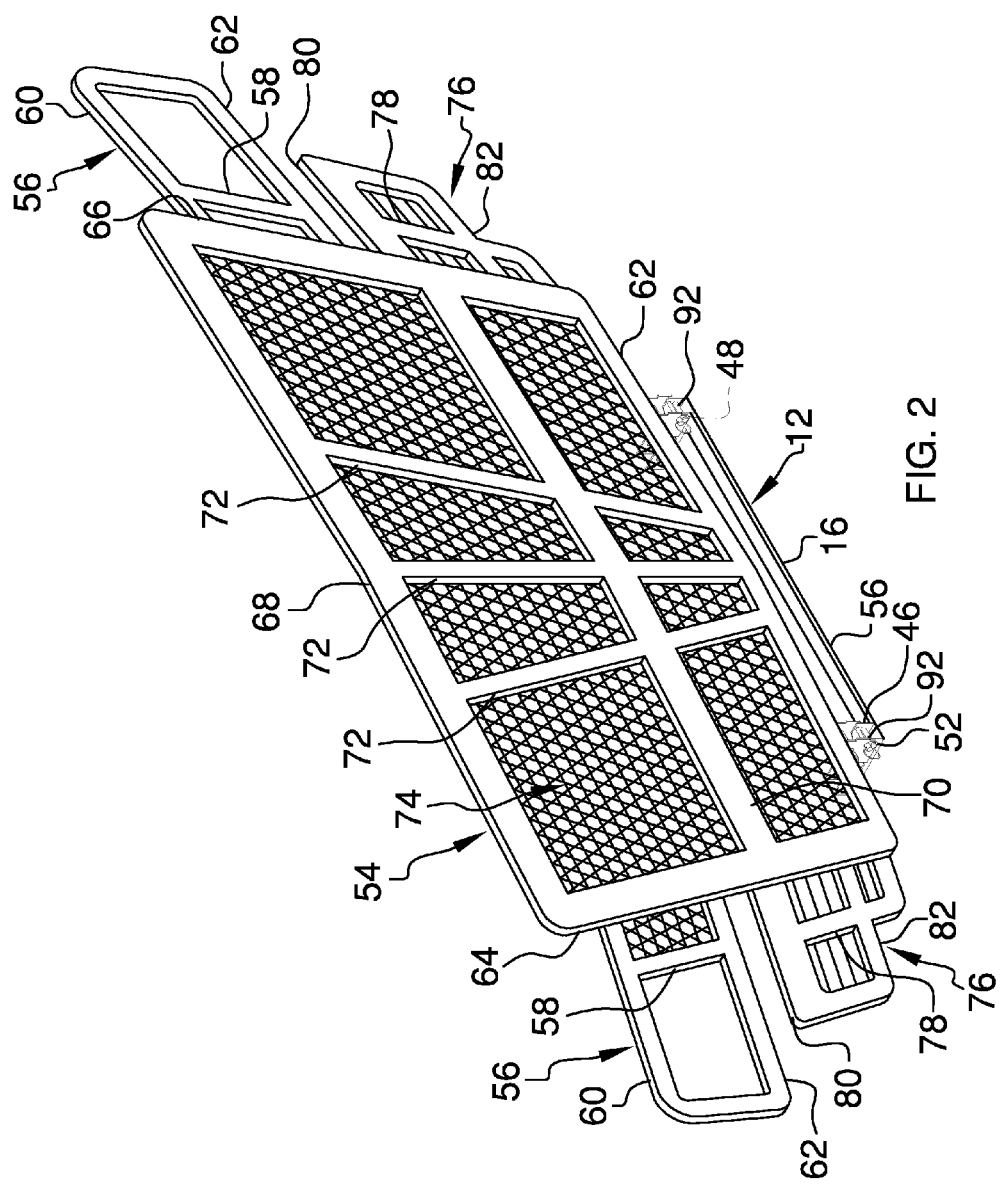
FIG. 2 is a front perspective view of an embodiment of the disclosure.
Figure 3:
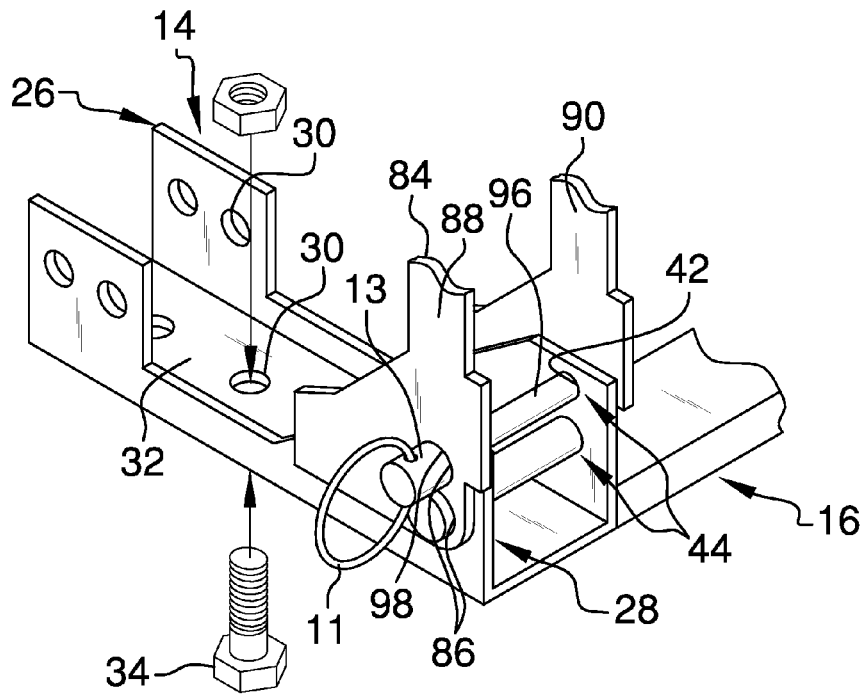
FIG. 3 is a left side perspective view of an embodiment of the disclosure.
Figure 4:
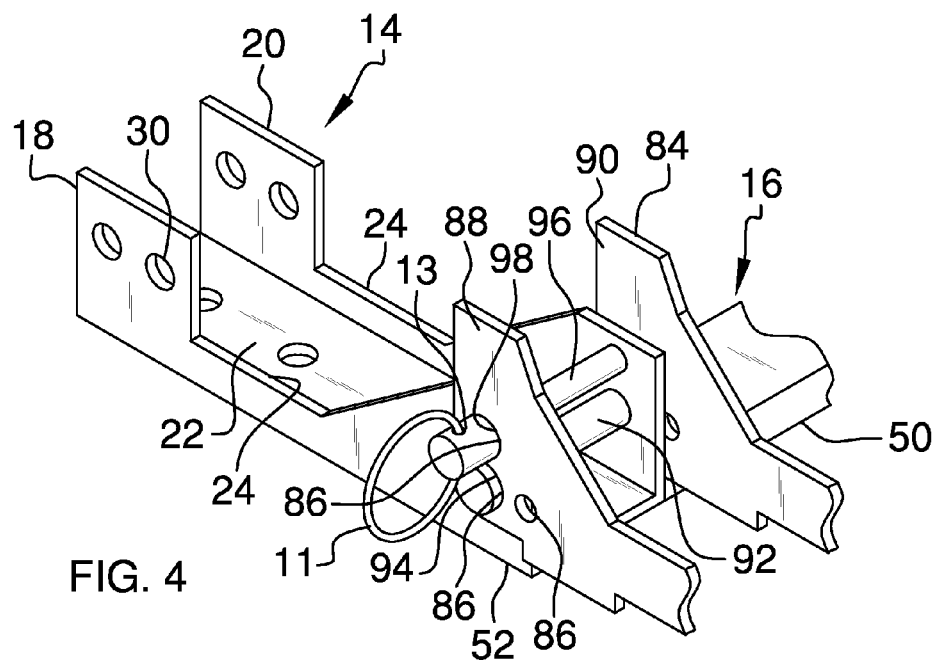
FIG. 4 is a perspective view of an embodiment of the disclosure.

As best illustrated in FIGS. 1 through 4, the mounting bracket assembly 10 generally comprises a bracket 12 comprising a coupling portion 14 of the bracket 12 extending rearwardly away from an arm portion 16 of the bracket 12. Each of a first lateral 18 and a second lateral 20 side of the coupling portion 14 of the bracket 12 is coupled to and extends upwardly from a lower portion 22 of the coupling portion 14 of the bracket 12. Moreover, the coupling portion 14 of the bracket 12 has a U-shape. A central portion 24 of each of the first 18 and second 20 lateral sides of the coupling portion 14 of the bracket 12 has a height that is less than a height of a rear portion 26 and a front portion 28 of each of the first 18 and second 20 lateral sides of the coupling portion 14 of the bracket 12. Lastly, the bracket 12 may have a length between 20 cm and 30 cm.

A mounting aperture 30 extends through the coupling portion 14 of the bracket 12. The mounting aperture 30 is one of a plurality of the mounting apertures 30. Continuing, the plurality of mounting apertures 30 is positioned on the rear portion 26 of each of the first 18 and second 20 lateral sides of the coupling portion 14 of the bracket 12 and a rear 32 of the lower portion 22 of the coupling portion 14 of bracket 12. A plurality of fasteners 34 extends through the plurality of mounting apertures 30 and engaging a bottom 36 of a vehicle 38. The vehicle 38 may be a pickup of any conventional design. The plurality of fasteners 34 may comprise a nut and bolt of any conventional design. Lastly, the bracket 12 is retained on the vehicle 38 so the front portion 28 of the bracket 12 is positioned proximate a front 40 of the vehicle 38.

A pin aperture 42 extends through the coupling portion 14 of the bracket 12. Additionally, the pin aperture 42 may have a diameter between 1.5 cm and 2.5 cm. The pin aperture 42 is one of a plurality of the pin apertures 42. Moreover, the plurality of pin apertures 42 comprises a pair of sets of pin apertures 44. The pair of sets of pin apertures 44 is positioned on the front portion 28 of each of the first 18 and second 20 lateral sides of the coupling portion 14 of the bracket 12.

The coupling portion 14 of the bracket 12 is one of a pair of the coupling portions 14 of the bracket 12. Each of the pair of coupling portions 14 of the brackets 12 is positioned proximate an associated one of a first end 46 and a second end 48 of the arm portion 16 of the bracket 12. A bottom surface 50 of the arm portion 16 of the bracket 12 is aligned with a bottom surface 52 of the lower portion 22 of the coupling portion 14 of the bracket 12. Additionally, the arm portion 16 of the bracket 12 may have a length between 60 cm and 90 cm.

A frame 54 is movably coupled to the bracket 12 so the frame 54 may guard the vehicle 38. The frame 54 is positionable between a stored position and an extended position. Moreover, the frame 54 may have a width between 120 cm and 178 cm and a height between 76 cm and 90 cm. A headlamp portion 56 of the frame 54 is coupled to and extends laterally away from the frame 54. Additionally, the headlamp portion 56 of the frame 54 comprises a closed loop. A vertical arm 58 of the headlight portion 56 of the frame 54 is coupled to and extends between a top arm 60 and a bottom arm 62 of the headlight portion 56 of the frame 54. The headlamp portion 56 of the frame 54 is one of a pair of the headlamp portions 56 of the frame 54 each positioned on an associated one of a first lateral arm 64 and a second lateral arm 66 of the frame 54 proximate a top arm 68 of the frame 54.

A central arm 70 of the frame 54 is coupled to and extends between each of the first lateral 64 and the second 66 lateral arms of the frame 54. Further, a plurality of vertical arms 72 is coupled to and extends between the top 60 and bottom 62 arms of the frame 54. The plurality of vertical arms 72 forms a V-shape. A grate 74 is coextensively coupled between each of the bottom 62, top 60, first lateral 64 and second lateral 66 arms of the frame 54. The grate 74 protects the front 40 of the vehicle 38 when the frame 54 is in the stored position. The grate 74 may comprise a rigid mesh of any conventional design.

A blinker portion 76 of the frame 54 is coupled to and extends laterally away from the frame 54. The blinker portion 76 of the frame 54 forms a closed loop. Continuing, a central arm 78 of the blinker portion 76 of the frame 54 extends between a top arm 80 and a bottom arm 82 of the blinker portion 76 of the frame 54. The central arm 78 of the blinker portion 76 of the frame 54 extends below the bottom arm 82 of the blinker portion 76 of the frame 54 and bends toward the frame 54. Moreover, the blinker portion 76 of the frame 54 is one of a pair of the blinker portions 76 of the frame 54 each positioned on an associated one of the first lateral arm 64 and the second lateral arm 66 of the frame 54 proximate the bottom arm 62 of the frame 54.

A U-shaped mount 84 is coupled to and extends downwardly from the bottom arm 62 of the frame 54. A plurality of pin apertures 86 extends through each of a first lateral side 88 and a second lateral side 90 of the U-shaped mount 84. Further, the U-shaped mount 84 may have a height between 5 cm and 8 cm. The U-shaped mount 84 is one of a pair of the U-shaped mounts 84 each positioned proximate an associated one the first lateral arm 64 and the second lateral arm 66 of the frame 54.

Each of the U-shaped mounts 84 engages an associated one of the front portions 28 of the coupling portion 14 of the pair of brackets 12. A pair of first pins 92 extends through each of a lower one of the pair of pin apertures 94 in the U-shaped mount 84 and an associated pair of pin apertures 42 in the front portion 28 of the coupling portion 14 of the bracket 12. The pair of first pins 92 ensures the frame 54 is movably coupled to the bracket 12. Lastly, the pair of first pins 92 may have a length between 7 cm and 10 cm.

A pair of removable pins 96 is selectively extendable through each of an upper one of the pair of pin apertures 98 in the U-shaped mount 84 and an associated pair of the pin apertures 42 in the front portion 28 of the coupling portion 14 of the bracket 12. The pair of removable pins 96 retains the frame 54 in the stored position so the frame 54 extends laterally along the front 40 of the vehicle 38. A hoop 11 is coupled to an outer end 13 of each of the pair of the removable pins 96 to be gripped by a user 15. The pair of removable pins 96 is selectively removable from the U-shaped mount 84 so the frame 54 is positionable in the extended position. The frame 54 extends forwardly from the front 40 of the vehicle 38 when the frame 54 is positioned in the extended position.

In use, the frame 54 is positioned in the stored position and the removable pins 96 are positioned to retain the frame 54 in the stored position. The frame 54 is positionable in the stored position to protect the front 40 of the vehicle 38 from being struck by an object. Continuing, the removable pins 96 are removed to position the frame 54 in the extended position. The frame 54 is positionable in the extended position to provide a support surface.

The assembly 10 may include a scoop 160, which is attached to the arm portion 16 of the bracket 12. Moreover, the scoop 160 extends downwardly from the arm portion 16 in order to deflect wind, and improve the drag qualities of the assembly 10 in connection with the vehicle 38.

With respect to the above description, it is to be realized that the optimum dimensional relationship for the various components of the assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A mounting bracket assembly for movably mounting a guard frame to a vehicle, said assembly comprising:
   a bracket coupled to the vehicle; and
   a frame movably coupled to said bracket wherein said frame is configured to guard the vehicle, said frame being positionable between a stored position and an extended position;
   wherein said bracket comprising a coupling portion of said bracket extending rearwardly away from an arm portion of said bracket;
   wherein each of a first lateral and a second lateral side of said coupling portion of said bracket being coupled to and extending upwardly from a lower portion of said coupling portion of said bracket wherein said coupling portion of said bracket has a U-shape;
   wherein a central portion of each of said first and second lateral sides of said coupling portion of said bracket having a height being less than a height of a rear portion and a front portion of each of said first and second lateral sides of said coupling portion of said bracket; wherein a scoop is attached to the arm portion of the bracket; wherein the scoop extends downwardly from the arm portion in order to deflect wind, and improve the drag qualities of the assembly in connection with the vehicle.

2. The assembly according to claim 1:
   wherein a mounting aperture extending through a coupling portion of said bracket;
   wherein said mounting aperture being one of a plurality of said mounting apertures;
   wherein said plurality of mounting apertures being positioned on a rear portion of each of a first and second lateral side of a coupling portion of said bracket and a rear of a lower portion of said bracket; and a plurality of fasteners extending through said plurality of mounting apertures and engaging a bottom of the vehicle wherein said bracket is retained on the vehicle.

3. The assembly according to claim 1:
wherein a pin aperture extending through a coupling portion of said bracket;
wherein said pin aperture being one of a plurality of said pin apertures;
wherein said plurality of pin apertures comprising a pair of sets of pin apertures; and
wherein said pair of sets of pin apertures being positioned on a front portion of each of a first and second lateral side of a coupling portion of said bracket.

4. The assembly according to claim 1 wherein said coupling portion of said bracket being one of a pair of said coupling portions of said bracket.

5. The assembly according to claim 4 wherein each of said pair of coupling brackets being positioned proximate an associated one of a first end and a second end of said arm portion of said bracket.

6. The assembly according to claim 1 wherein a U-shaped mount coupled to and extending downwardly from a bottom arm of said frame.

7. The assembly according to claim 1 wherein a plurality of pin apertures extending through each of a first lateral side and a second lateral side of a U-shaped mount.

8. The assembly according to claim 6 wherein said U-shaped mount being one of a pair of said U-shaped mounts each positioned proximate an associated one a first lateral arm and a second lateral arm of said frame; wherein each of a U-shaped mounts engaging an associated one of a front portion of a coupling portion of a pair of said brackets wherein a first pin extends through said each of a lower ones of a pair of pin apertures in said U-shaped mount and an associated pair of pin apertures in said forward portion of said coupling portion of said bracket wherein said frame is movably coupled to said bracket.

9. The assembly according to claim 1 wherein a removable pin selectively extending through each of an upper one of a pair of pin apertures in a U-shaped mount and an associated pair of pin apertures in a forward portion of a coupling portion of said bracket wherein said frame is retained in said stored position wherein said frame extends laterally along a front of the vehicle.

10. The assembly according to claim 9 wherein a removable pin being selectively removed from said U-shaped mount wherein said frame is positionable in said extended position wherein said frame extends forwardly from a front of the vehicle.

11. The assembly according to claim 1 wherein a headlamp portion of said frame coupled to and extending laterally away from said frame wherein said headlamp portion of said frame comprises a closed loop.

12. The assembly according to claim 11 wherein said headlamp portion of said frame being one of a pair of said headlamp portions of said frame each positioned on an associated one of a first lateral arm and a second lateral arm of said frame proximate a top arm of said frame.

13. The assembly according to claim 1 wherein a central arm of said frame coupled to and extending between each of a first lateral and a second lateral arm of said frame.

14. The assembly according to claim 1 wherein a grate coextensively coupled between each of a bottom, top, first lateral and second lateral arms of said frame wherein said grate protects a front of the vehicle when said frame is in said stored position.

15. The assembly according to claim 1 wherein a blinker portion of said frame coupled to and extending laterally away from said frame wherein said blinker portion of said frame forms a closed loop.

16. The assembly according to claim 15 wherein said blinker portion of said frame being one of a pair of said blinker portions of said frame each positioned on an associated one of a first lateral arm and a second lateral arm of said frame proximate a bottom arm of said frame.

17. A mounting bracket assembly for movably mounting a guard frame to a vehicle, said assembly comprising:
a bracket comprising a coupling portion of said bracket extending rearwardly away from an arm portion of said bracket, each of a first lateral and a second lateral side of said coupling portion of said bracket being coupled to and extending upwardly from a lower portion of said coupling portion of said bracket wherein said coupling portion of said bracket has a U-shape, a central portion of each of said first and second lateral sides of said coupling portion of said bracket having a height being less than a height of a rear portion and a front portion of each of said first and second lateral sides of said coupling portion of said bracket;
a mounting aperture extending through said coupling portion of said bracket, said mounting aperture being one of a plurality of said mounting apertures, said plurality of mounting apertures being positioned on said rear portion of each of said first and second lateral sides of said coupling portion of said bracket and a rear of said lower portion of said bracket;
a plurality of fasteners extending through said plurality of mounting apertures and engaging a bottom of the vehicle wherein said bracket is retained on the vehicle wherein said front portion of said bracket is positioned proximate a front of the vehicle;
a pin aperture extending through said coupling portion of said bracket, said pin aperture being one of a plurality of said pin apertures, said plurality of pin apertures comprising a pair of sets of pin apertures, said pair of sets of pin apertures being positioned on said front portion of each of said first and second lateral sides of said coupling portion of said bracket;
said coupling portion of said bracket being one of a pair of said coupling portions of said bracket, each of said pair of coupling brackets being positioned proximate an associated one of a first end and a second end of said arm portion of said bracket,
a frame movably coupled to said bracket wherein said frame is configured to guard the vehicle, said frame being positionable between a stored position and an extended position, said frame comprising;
a headlamp portion of said frame coupled to and extending laterally away from said frame wherein said headlamp portion of said frame comprises a closed loop, said headlamp portion of said frame being one of a pair of said headlamp portions of said frame each positioned on an associated one of a first lateral arm and a second lateral arm of said frame proximate a top arm of said frame;
a central arm of said frame coupled to and extending between each of said first lateral and said second lateral arms of said frame;
a grate coextensively coupled between each of a bottom, said top, said first lateral and said second lateral arms of said frame wherein said grate protects the front of the vehicle when said frame is in said stored position;

a blinker portion of said frame coupled to and extending laterally away from said frame wherein said blinker portion of said frame forms a closed loop, said blinker portion of said frame being one of a pair of said blinker portions of said frame each positioned on an associated one of said first lateral arm and said second lateral arm of said frame proximate said bottom arm of said frame;

a U-shaped mount coupled to and extending downwardly from said bottom arm of said frame;

a plurality of pin apertures extending through each of a first lateral side and a second lateral side of said U-shaped mount;

said U-shaped mount being one of a pair of said U-shaped mounts each positioned proximate an associated one said first lateral arm and said second lateral arm of said frame, each of said U-shaped mounts engaging an associated one of said front portions of said coupling portion of said pair of brackets wherein a first pin extends through each of a lower ones of said pair of pin apertures in said U-shaped mount and an associated pair of pin apertures in said forward portion of said coupling portion of said bracket wherein said frame is movably coupled to said bracket;

a removable pin selectively extending through each of an upper one of said pair of pin apertures in said U-shaped mount and an associated pair of said pin apertures in said forward portion of said coupling portion of said bracket wherein said frame is retained in said stored position wherein said frame extends laterally along the front of the vehicle; and said removable pin being selectively removed from said U-shaped mount wherein said frame is positionable in said extended position wherein said frame extends forwardly from the front of the vehicle.

\* \* \* \* \*